(12) United States Patent
Yu et al.

(10) Patent No.: US 10,581,171 B2
(45) Date of Patent: Mar. 3, 2020

(54) ANTENNA ELEMENT STRUCTURE SUITABLE FOR 5G MOBILE TERMINAL DEVICES

(71) Applicant: SPEED WIRELESS TECHNOLOGY INC., San Jose, CA (US)

(72) Inventors: Bin Yu, Suzhou (CN); Zhanyi Qian, Suzhou (CN); Xitong Wu, Suzhou (CN)

(73) Assignees: SPEEDLINK TECHNOLOGY INC., Cupertino, CA (US); HUIZHOU SPEED WIRELESS TECHNOLOGY CO., LTD, Guangdong (CN)

( * ) Notice: Subject to any disclaimer, the term of this patent is extended or adjusted under 35 U.S.C. 154(b) by 121 days.

(21) Appl. No.: 15/725,215

(22) Filed: Oct. 4, 2017

(65) Prior Publication Data
US 2018/0309203 A1 Oct. 25, 2018

(30) Foreign Application Priority Data
Apr. 20, 2017 (CN) .......................... 2017 1 0261739

(51) Int. Cl.
*H01Q 9/16* (2006.01)
*H01Q 1/24* (2006.01)
*H01Q 1/50* (2006.01)
*H01Q 1/38* (2006.01)
*H04M 1/02* (2006.01)

(52) U.S. Cl.
CPC ............... *H01Q 9/16* (2013.01); *H01Q 1/241* (2013.01); *H01Q 1/243* (2013.01); *H01Q 1/38* (2013.01); *H01Q 1/50* (2013.01); *H04M 1/026* (2013.01)

(58) Field of Classification Search
CPC .... H01Q 1/2258; H01Q 1/2266; H01Q 1/241; H01Q 1/243; H01Q 1/38; H01Q 9/065; H01Q 9/16; H01Q 9/285; H01Q 21/06; H01Q 21/061; H01Q 21/062;
(Continued)

(56) References Cited

U.S. PATENT DOCUMENTS 6,424,309 B1 * 7/2002 Johnston .................. H01Q 9/28
343/725
7,388,550 B2 * 6/2008 McLean .................... H01Q 1/38
343/725

(Continued)

*Primary Examiner* — Daniel Munoz
*Assistant Examiner* — Patrick R Holecek
(74) *Attorney, Agent, or Firm* — Womble Bond Dickinson (US) LLP

(57) ABSTRACT

A novel antenna element includes a PCB, a radiating element disposed on the surface of the PCB, and a feed structure. The radiating element is constituted by a magnetic dipole and an electric dipole. The magnetic dipole comprises a first magnetic dipole conductive part disposed on the first surface, a second magnetic dipole conductive part disposed on the second surface, and a first metal via array which penetrates the PCB and is connected with edges of the first and second magnetic dipole conductive parts. The electric dipole is constituted by a first electric dipole conductive part which is connected with the first magnetic dipole conductive part and a second electric dipole conductive part which is connected with the second magnetic dipole conductive part. The feed structure is connected with the first magnetic dipole conductive part and the magnetic dipole extends to the ground.

20 Claims, 10 Drawing Sheets

(58) Field of Classification Search
CPC ...... H01Q 21/205; H01Q 21/28; H01Q 21/29; H01Q 21/293; H01Q 25/00; H01Q 25/002

See application file for complete search history.

(56) References Cited

U.S. PATENT DOCUMENTS

| | | | |
|---|---|---|---|
| 8,077,095 B2* | 12/2011 | Suh | H01Q 1/243 |
| | | | 343/700 MS |
| 9,570,809 B2* | 2/2017 | Ganchrow | H01Q 9/285 |
| 10,135,149 B2* | 11/2018 | Zhou | H01Q 13/106 |

* cited by examiner

ANTENNA ELEMENT STRUCTURE SUITABLE FOR 5G MOBILE TERMINAL DEVICES

RELATED APPLICATIONS

This application claims the priority of Chinese patent application No. 201710261739.1, filed Apr. 20, 2017, which is incorporated by reference in its entirety.

FIELD OF THE DISCLOSURE

This disclosure relates generally to the technical field of antenna. More specifically, this disclosure relates to an antenna element structure used in a fifth generation (5G) mobile terminal.

BACKGROUND

Nowadays, new customer requirements and business pattern have changed a lot. Traditional services like voice, short message have been replaced by mobile internet. Progress on cloud computing puts the core of the service into the cloud and the transmission of controlling message is mainly between terminals and internet, therefore this kind of business mode places huge challenge to the traditional voice communication model. Machine-to-machine/Internet of thing (M2M/IoT) technologies bring mass devices connections, ultralow latency services, and ultrahigh definition. Virtual reality services and enhanced reality services bring the transmission speed requirements of far beyond Giga bit per second (Gbps). However, the existing fourth generation (4G) technology cannot satisfy such requirements.

Facing a human's information society in the future of 2020, related technology of 5G has not reached a stable standard. But the basic features of 5G are clear, such as a high speed, a low latency, a mass devices connection, and a low power consumption. A 5G antenna is the main component of 5G terminals. Unless we innovatively defeat the technology difficulty of the antenna design, we cannot ensure a normal run and commercial use of 5G system. So this invention plays a positive and vital role in boosting and promoting the development of the new generation of mobile communication system and 5G terminals.

The existing millimeter (mm) wave antenna elements that can be integrated in mobile terminals include monopole, dipole, Yagi, slot, patch, or Vivaldi antennas. Particularly, Yagi, patch, and Vivaldi antennas are directional antennas with a narrow beam width and high gain. Slot and dipole antenna are omnidirectional in free space, but when they are integrated on a printed circuit board (PCB) board, the antenna radiation pattern may become directional due to the influence of dielectric substrate and ground board. Some low efficient and omnidirectional radiating antennas such as IFA, PIFA, or other electrically small antennas for third generation (3G) or 4G mobile terminals does not meet the requirements of the 5G communication. Therefore a novel antenna element suitable for 5G mobile terminals needs to be proposed.

SUMMARY

In order to solve the above technical problems, this disclosure proposes a novel antenna element suitable for 5G mobile terminals. A novel antenna element for a 5G mobile terminal contains a PCB board which has a first surface and a second surface, a radiating element disposed on the surface of the PCB, and a feed structure. The radiating element includes a magnetic dipole and an electric dipole. The magnetic dipole includes a first magnetic dipole conductive part disposed on the first surface, a second magnetic dipole conductive part disposed on the second surface, and a first metal vertical interconnect access (via or VIA) array which penetrates the PCB and is connected with edges of the first magnetic dipole conductive part and the second magnetic dipole conductive part. The electric dipole includes a first electric dipole conductive part which is connected with the first magnetic dipole conductive part and the second electric dipole conductive part which is connected with the second magnetic dipole conductive part. The feed structure is connected with the first magnetic dipole conductive part and the magnetic dipole extends to a ground. The first magnetic dipole conductive part and the second magnetic dipole conductive part are copper layers arranged in parallel to each other.

Further, a distance between two adjacent vias in the first metal via array is less than a quarter-wavelength ($\lambda/4$) and a diameter of the individual metal via is less than one eighth of the wavelength ($\lambda/8$). The PCB board includes at least a first dielectric layer and a second dielectric layer, and the feed structure is disposed between the first dielectric layer and the second dielectric layer.

As a further embodiment of the novel antenna element, the radiation element can include three embodiments. A first embodiment of the radiation element contains a printed magnetic dipole structure and a surface mount technology (SMT) electric dipole structure. The printed magnetic dipole structure is printed on the different layers of the PCB, the function of which is realized by adding short metal vias. The electric dipole structure is composed of two metal blocks which is connected with the PCB by a surface mounting technology.

Specifically, the first electric dipole conductive part or the second electric dipole conductive part is a metal block, and the shape of the first electric dipole conductive part or the second electric dipole conductive part is rectangular or ladder-shape. The length of the first electric dipole conductive part or the second electric dipole conductive part is one-eighth to half wavelength along the direction of the current, preferably quarter-wavelength. The first electric dipole conductive part and the second electric dipole conductive part are connected with the first magnetic dipole conductive part and the second magnetic dipole conductive part by the SMT process, respectively.

A second embodiment of the radiation element contains a printed magnetic dipole structure and a printed electric dipole structure. The printed magnetic dipole is printed on different layers of the PCB, the function of which is realized by adding short metal vias. The printed electric dipole structure is composed of two copper layers which are printed in the thickness direction of the PCB, and it is realized by metal wrapping process.

Specifically, the first magnetic dipole conductive part and the second magnetic dipole conductive part surface are disposed on a third dielectric layer and a fourth dielectric layer. The first electric dipole conductive part and the second electric dipole conductive part formed by wrapping copper on the third dielectric layer and the fourth dielectric layer along thickness direction of the PCB, respectively. The size of the first electric dipole conductive or the second electric dipole conductive part in the direction of the current equals to the thickness of the third dielectric layer or the fourth dielectric layer. The thickness of the PCB dielectric layer is one-eighth to half wavelength in the third dielectric layer or the fourth dielectric layer, preferably, quarter-wavelength. The length of the first electric dipole conductive part and the second electric dipole conductive part in a longitudinal direction of PCB is smaller than that of the first metal via array, or the length of the first and second magnetic dipole conductive parts in the longitudinal direction of the PCB is smaller than the length of the first metal via array.

The third embodiment of the radiation element contains a printed magnetic dipole and a metal via electric dipole. The printed magnetic dipole is printed on different layers of the PCB, the function of which is realized by adding short metal vias. The electric dipole is composed of metal vias, which are realized by drilling metallic holes in the thickness direction of the PCB.

Specially, a third dielectric layer and a fourth dielectric layer are disposed on the first magnetic element and the second magnetic element, respectively. The first electric dipole conductive part and the second electric dipole conductive part are metal via arrays passing through the third dielectric layer and the fourth dielectric layer in a thickness direction of the PCB, respectively. The rectangular copper layers which are connected with the metal via disposed on an outer surface of the third dielectric layer or the fourth dielectric layer, and the length of the rectangular copper layer is smaller than the length of the first electric dipole conductive part or the second electric dipole conductive part. In addition, the first electric dipole conductive part and the second electric dipole conductive part are symmetrical with respect to the PCB board. The length of the metal via array is less than the length of the first metal via array. The distance between two adjacent vias in the metal via array is less than quarter-wavelength and the diameter of the individual metal vias is less than one eighth of the wavelength.

For the feed structure, the feed structure can be a metal strip line, a coplanar waveguide structure, or a microstrip line structure. When the feed structure is a metal strip line, its first feed terminal passes through the metal via electric dipole feed array disposed in the first dielectric layer and is connected with the first electric dipole conductive part, and its second feed terminal is connected with an external radio frequency (RF) frontend module. The feed structure is distributed in the multi-layers of the PCB board, each layer is connected by a first feed metal via penetrating through at least one dielectric layer.

In addition, the ground terminal includes a first copper layer disposed on the surface of the first dielectric layer and a second copper layer disposed on the surface of the second dielectric layer. The first copper layer and the second copper layer are connected by at least a group of the second metal via array which penetrates through the first dielectric layer and the second dielectric layer simultaneously. The second metal via array is distributed on both sides of the feed structure and is symmetrical with respect to the feed structure.

The beneficial effects of the present invention include: for the first embodiment of the radiation element, the structure is simple and can be easily assembled by the SMT process. For the second embodiment of the radiation element, an electric dipole is printed in the thickness direction of the PCB board, and the overall thickness of the antenna can be reduced, which is more suitable for occasions where the low antenna profile is required. For third embodiment of the radiation element, it also has the advantage of the low profile of the using of the metal vias, and the processing is more convenient and the structure is stronger.

The magneto-electric dipole antenna elements of the present invention has the advantages of a simple structure, a wide bandwidth, and a high gain, and can be easily integrated on a PCB. It can cover three or more adjacent bands in the 5G alternative frequency bands planned by many countries, and is very suitable for the 5G mobile communication system, especially for the application of 5G millimeter wave frequency band.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

The preferred embodiments of the present invention will be described in detail with reference to the accompanying drawings, thus the advantages and features of the present invention will be more readily understood by those skilled in the art and thus the scope of the invention will be more clearly defined.

With respect to the Figures listed, the PCB is 100, the first surface is 111, the second surface is 121, the first dielectric layer is 110, the second dielectric layer is 120, the third dielectric layer is 130, the fourth dielectric layer is 140, the radiating element is 200, the magnetic dipole is 210, the first magnetic dipole conductive part is 211, the second magnetic dipole conductive part is 212, the first metal vias array is 213, the electric dipole is 220, the first electrical dipole conductive part is 221, the electrical dipole conductive part is 222, the rectangular copper layer is 223, the feed structure is 300, the first copper layer is 410, the second copper layer is 420, the third copper layer is 430; the second metal vias array is 440, the strip shape copper layer is 450.

Embodiment 1

Figure 1:
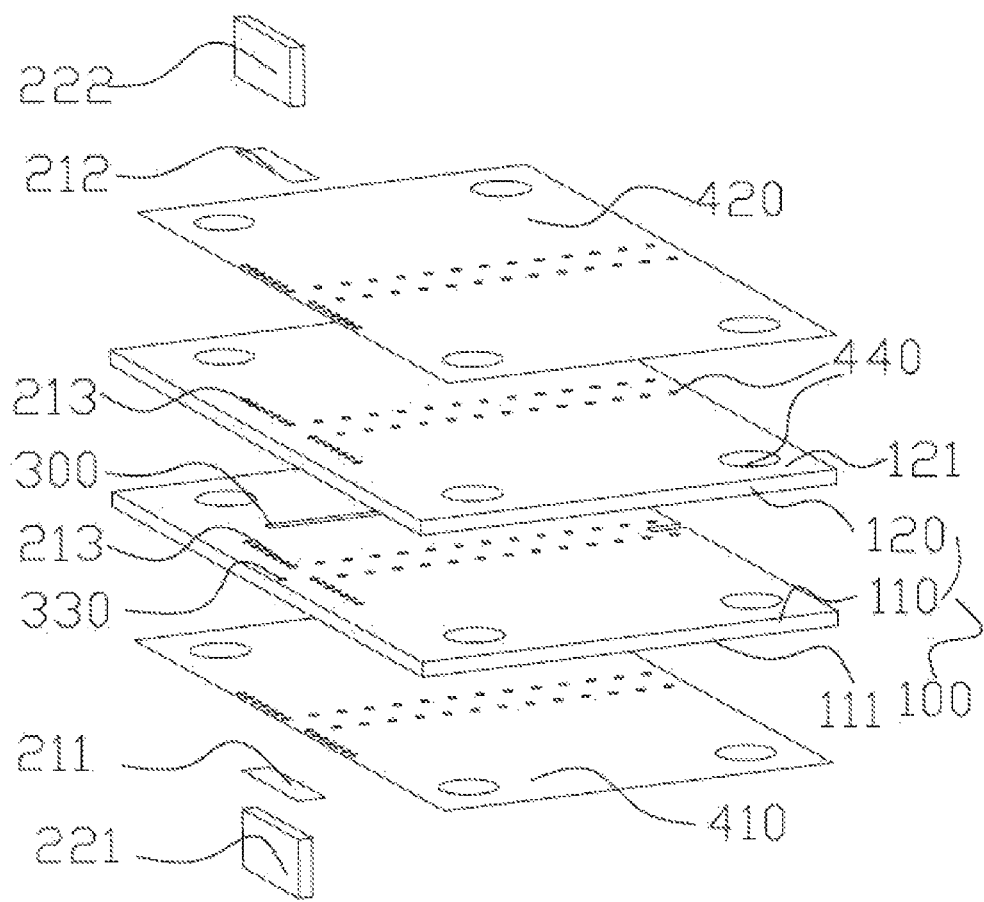
FIG. 1 illustrates an exploded schematic of the antenna element structure in the embodiment 1 or 2 of the present invention.
Figure 2:
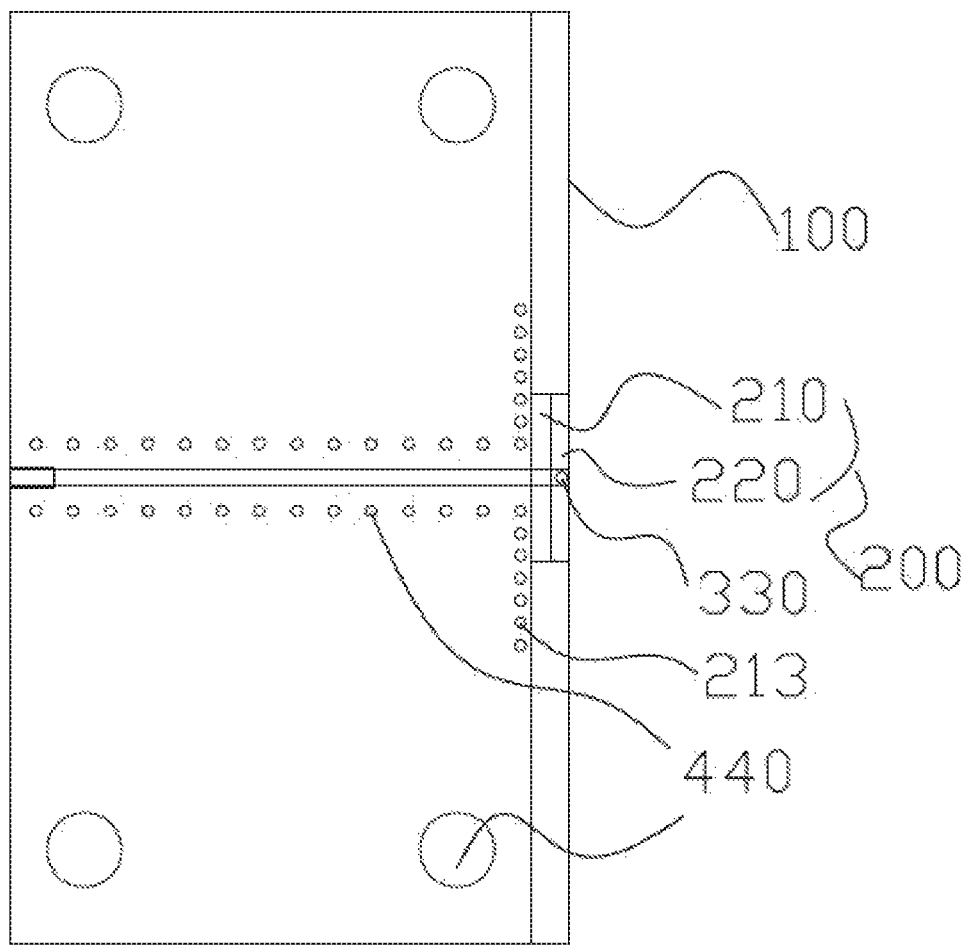
FIG. 2 illustrates a top view schematic of the antenna element structure in the embodiment 1 or 2 of the present invention.

The novel antenna elements of the 5G mobile terminal in the present embodiment are shown in FIGS. 1 and 2. It contains a PCB board 100, a radiation element 200, and a feed structure 300. The PCB board 100 has a first surface 111 and a second surface 121, and the surface 111 is opposite to the second surface 121. The radiation element 200 is disposed on PCB board. In addition, the feed structure 300 is disposed in the PCB board 100 or on the surface of the PCB board 100 to transmit feed signal. The radiation element 200 of the present embodiment contains a magnetic dipole 210 and an electric dipole 220. The direction of the magnetic dipole 210 and the electric dipole 220 is perpendicular to each other to obtain a directional radiation pattern and a wide bandwidth.

The magnetic dipole 210 contains a first magnetic dipole conductive part 211, a second magnetic dipole conductive part 212 and a first metal via array 213. The first magnetic dipole conductive part 211 is disposed on the first surface 110, and the second magnetic dipole conductive part 212 is disposed on the second surface 120, and two magnetic dipoles conductive parts form a symmetrical structure. The first metal via array 213 passes through the PCB board 100, the both ends of which is connected with the edges of the first magnetic dipole conductive part 211 and the second magnetic dipole conductive part 212, respectively. The edges of the first magnetic dipole conductive part 211 and the second magnetic dipole conductive part 212 should be corresponding to each other, and eventually the magnetic dipole 210 forms a U-shape structure.

In the present embodiment, the first magnetic dipole conductive part 211 and the second magnetic dipole conductive part 212 are copper layers arranged in parallel to each The shape of the copper layer can be but not limited to rectangles and symmetrical irregular shapes. In addition, the ground of the antenna element is extended by the magnetic dipole Specifically, the ground terminal includes a first copper layer 410 disposed on the first layer 110 and a second copper layer 420 disposed on the second substrate layer 120. The area the two copper layers is larger than the area of the magnetic dipole 210. The first copper layer 410 and the second copper layer 420 are connected with the first magnetic dipole conductive part 211 and the second magnetic dipole conductive part 212, respectively. The first copper layer 410 and the second copper layer 420 are connected by at least one group of the second metal via array which penetrates both of the first dielectric layer 110 and the second dielectric layer 120. Preferably, in order to connect as much as possible, the number of the vias of the second metal via array 440 can be configured with a few more vias accordingly.

The electric dipole 220 contains a first electric dipole conductive part 221 and a second electric dipole conductive part 222. The first electric dipole conductive part 221 is connected with the first magnetic dipole conductive part 211, and the second electric dipole conductive part 222 is connected with the second magnetic dipole conductive part 212. It is fed between the two electric dipole conductive parts by the magnetic dipole 210, therefore a magneto-electric dipole structure is formed. In addition, the external feed signal is connected with the first magnetic dipole conductive part 211 through the feed structure 300, then the feed signal is transmitted to the first magnetic dipole conductive part 221, therefore the feed of the electric dipole 220 and the magnetic dipole 210 can be achieved.

Embodiment 2

The difference between the present embodiment and the embodiment 1 is as in FIGS. 1 and 2. The PCB board 100 in the present embodiment includes a first dielectric 110 and a second dielectric layer 120 which are stacked together. A first magnetic dipole conductive part 211 of a magnetic dipole 210 is disposed on an outer surface of the first dielectric layer 110. A second magnetic dipole conductive part 212 is disposed on an outer surface of the second dielectric layer 120. Correspondingly, a first metal via array 213 is disposed within the PCB board 100 while passing through the first dielectric layer 110 and the second dielectric layer 120 simultaneously. Both ends of a first metal via array 213 are connected to the first magnetic dipole conductive part 211 and the second magnetic dipole conductive part 212, respectively.

The arrangement of the first metal via array 213 in this embodiment is a linear arrangement, and spacing between the metal via array should be less than quarter-wavelength ($\lambda/4$), and a diameter of a metal via is less than one-eighth wavelength ($\lambda/8$). To ensure the construction of the magnetic dipole 210, the first metal via array 213 needs to form at least the effect of a metal wall. The electric dipole 210 should be disposed on the edge of the PCB board 100. It is to be noted that the length of the first metal via array 213 needs to be larger than the length of the two magnetic couple conductive parts 211 and 212 of the magnetic dipole 210 in a longitudinal direction of the PCB board 100.

The two electric dipole conductive parts 221 and 222 of the electric dipole 220 in this embodiment are composed of two small metal blocks. The shape of the electric dipole conductive parts 221 and 222 can be a rectangular, a ladder-shape, or a prism or a pyramid. first electric dipole conductive part 221 and the second electric dipole conductive part 222 are also symmetrically disposed with respect to the feed structure 300 in the PCB board 100, and should also be disposed on the edge of the PCB board 100. The two electric dipole conductive parts 221 and 222 can be connected to the two magnetic dipole elements 211 and 212 on the outer edges of the PCB 100 by soldering or SMT process. For ease of description, the edges the first electric dipole conductive part 221 and the second electric dipole conductive part 222 along a length direction of the PCB board 100 is defined as a long side, and the edges of the electric dipole conductive part 221 and the second electric dipole conductive part 222 along thickness direction of the PCB board 100 is defined as a wide side. In order to facilitate the surface mounting, the thickness of the electric dipole conductive part can be increased, preferably, the thickness can be from 0.5 mm to 2 mm. The length of the electric dipole conductive part is preferably equal to the length of the magnetic dipole 210 and needs to be smaller than the length of the first metal via array 213.

Figure 7:
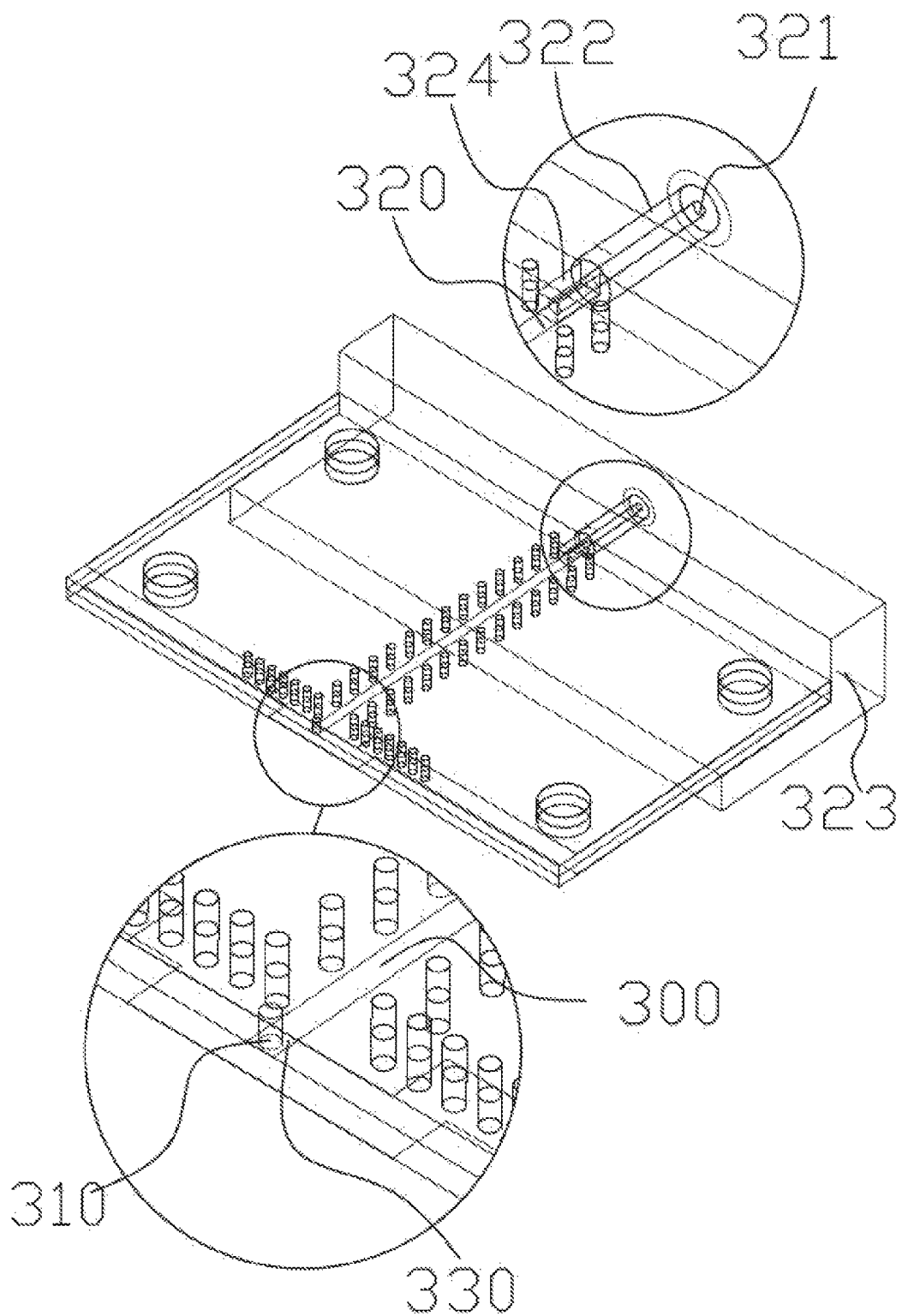
FIG. 7 illustrates a schematic of the feed structure in the embodiment 1 to 4 of the present invention.

In the feed structure 300, as shown in FIG. 7, the feed structure 300 of the present embodiment is disposed between the first dielectric layer 110 and the second dielectric layer 120. It is preferable that the feed structure 300 in the present embodiment is a metal strip disposed on the symmetry axis of the first magnetic dipole conductive part 211 and the second magnetic dipole conductive part 212, which passes through a center gap of the first metal via array to feed the magnetic dipole 210.

The feed approach of the feed structure 300 can be a direct feed or a coupling feed, and the present embodiment adopts a direct feed approach. That is, the first feed terminal 310 of the feed structure 300 is connected with the first magnetic dipole conductive part 211 through the metal via array 330. In this embodiment, the feed metal via array 330 penetrates the first dielectric layer 110. The second feed terminal 320 is connected with an external RF frontend module. The electric dipole feed metal via array 330 can adjust the number of the metal vias according to the area of the connection points and the requirements of the design spec, however, the number the metal vias should be at least one. The present embodiment adopts a single via to simplify the structure.

The second feed terminal 320 of the present embodiment is connected with the center conductor 321 of the test connector, and the outer conductor 322 of the test connector passes through the metal fixture 323. The first dielectric layer 110 has been hollowed out a rectangular shape 324 with a length of 1~2 mm which provides a connection between the feed structure 300 and the center conductor 321. In addition, the arrangement of the feed structure 300 in this embodiment is also along one of the symmetry axis of the electric dipole 220 and perpendicular to the direction of the electric dipole 220.

In addition, a certain number of the second metal via array 440 can be disposed between the first copper layer 410 and the second copper layer 420 for the increase of conductivity of the ground, and the second metal via array 440 can be distributed on the both sides of the feed structure 300, and can be symmetrically distributed with respect to the feed structure 300. In addition, the diameter of the metal vias of the second metal via array 440 can be increased, so the metal vias can also act as a locating hole at the same time.

Considering the functionality and the price, the antenna element is printed on a FR4 dielectric substrate with the permittivity of 4~4.8, and the thickness of the substrate can be between 0.5 mm and 2 mm, and in some preferred embodiments, the substrate permittivity is 4.4, and the thickness of the laminated substrate is 1 mm, and the thickness of the upper and lower substrates is 0.5 mm, respectively. The length, width, and thickness of the metal block constituting the electric dipole 220 are 4.5 mm, 2 mm, and 0.5 mm, respectively. The width of the copper layer constituting the magnetic dipole 210 is 4.5 mm or 1 mm.

Figure 9:
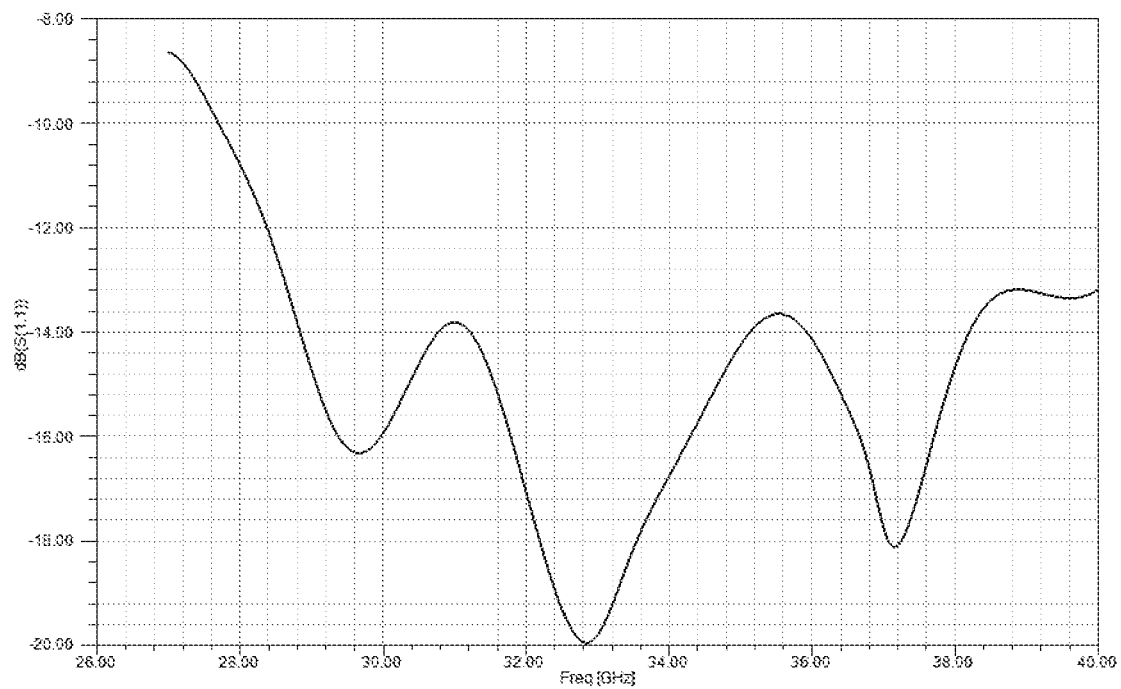
FIG. 9 illustrates a simulated S11 curve of the antenna element operating at 26-40 GHz in the embodiment 1 or 2 of the present invention.
Figure 10:
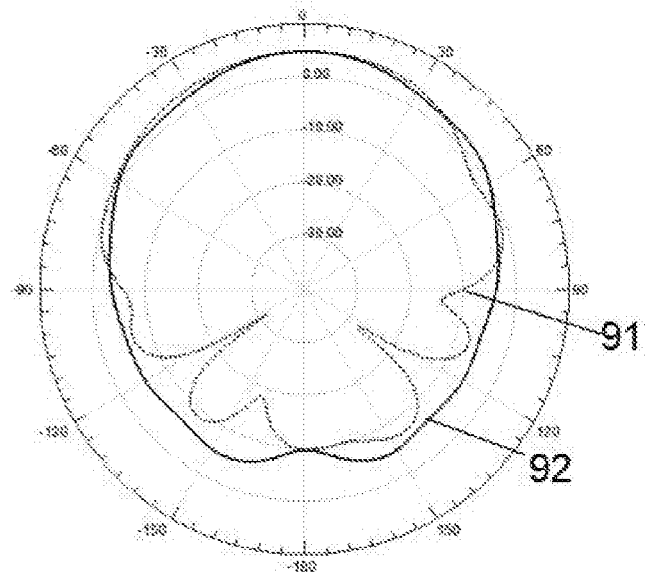
FIG. 10 illustrates the simulated radiation pattern of the antenna element operating at 28 GHz according to the embodiment 1 or 2 of the present invention.
Figure 11:
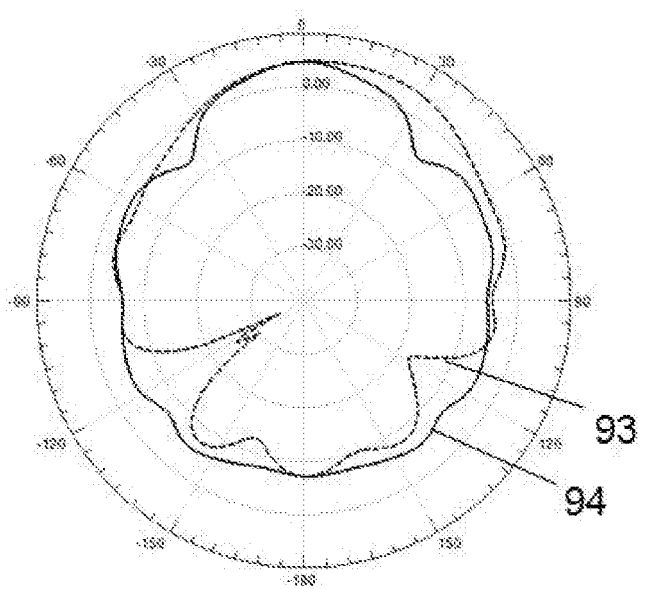
FIG. 11 illustrates the simulated radiation pattern of the antenna element operating at 39 GHz in the embodiment 1 or 2 of the present invention.

FIG. 9 shows a simulation result of the S11 parameter of the present embodiment, and the impedance bandwidth of the antenna element is more than 50%. In addition, FIG. 10 shows a zenith antenna gain of 4.8 dBi at 28 GHz, curve 91 is the radiation pattern of δ=90° plane, and curve 92 is the radiation pattern of δ=0° plane. FIG. 11 shows a zenith antenna gain of 4.9 dBi at 39 GHz, curve 93 is the radiation pattern of δ=90° plane, curve 94 is the radiation pattern of δ=0° plane.

Embodiment 3

Figure 3:
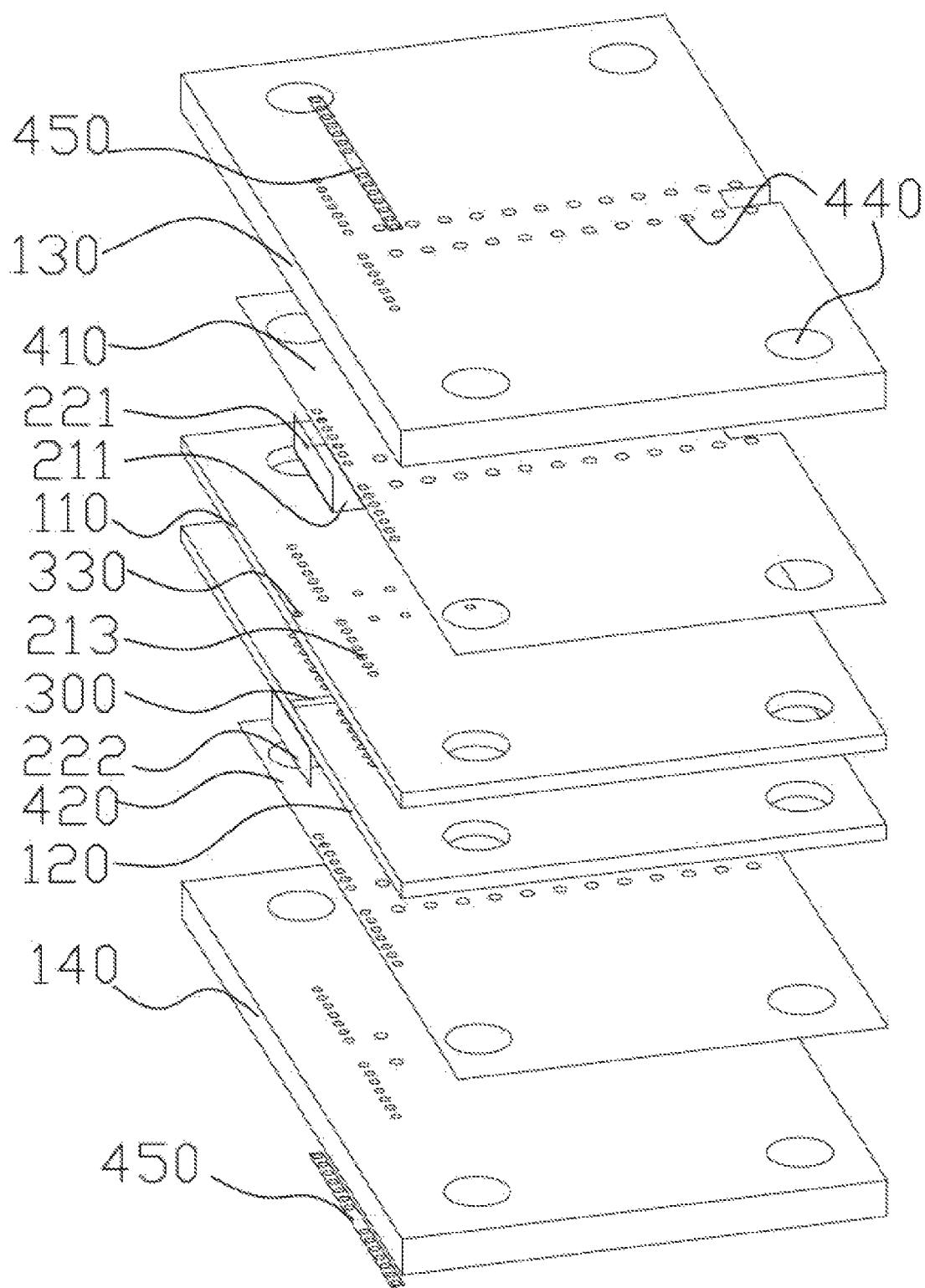
FIG. 3 illustrates an exploded schematic of the antenna element structure according to the embodiment 3 of the present invention.
Figure 4:
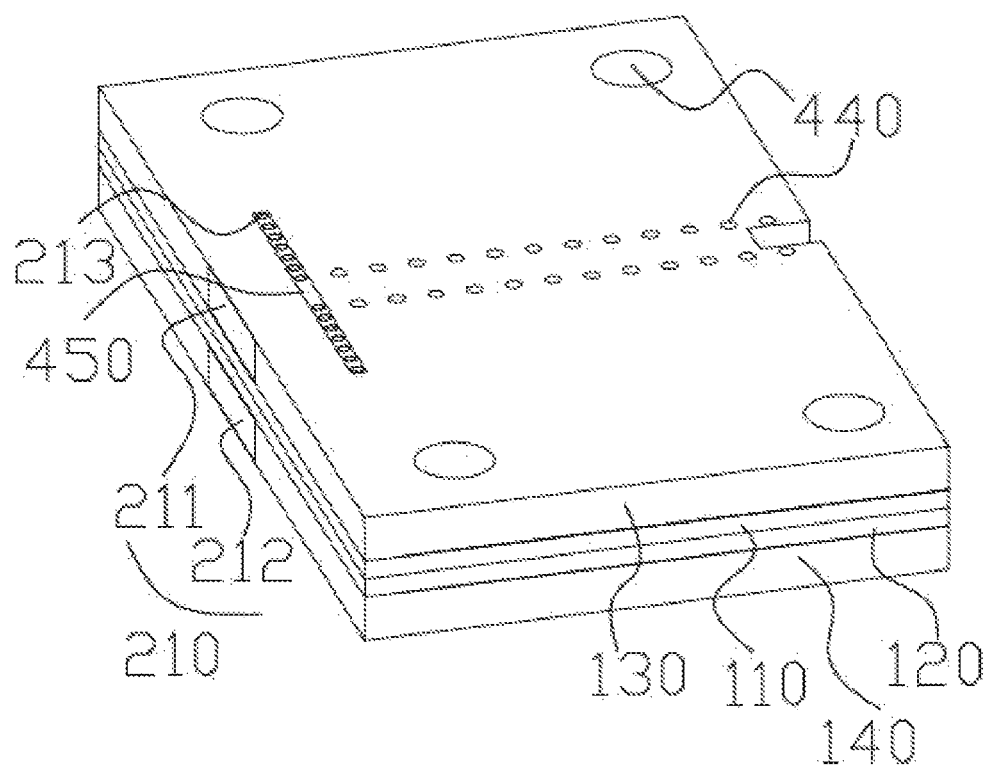
FIG. 4 illustrates a schematic of the antenna element structure according to the embodiment 3 of the present invention.

The difference between the present embodiment and embodiment 2 is that the PCB board 100 in the present embodiment includes a third dielectric layer 130 laminated on the outer surface of the first dielectric layer 110 and a fourth dielectric layer 140 laminated on the outer surface of the second dielectric layer 120 as shown in FIGS. 3 and 4. The third dielectric layer 130 is disposed on the outer surface of the first magnetic dipole conductive part 211, and the fourth dielectric layer 140 is disposed on the outer surface of the second magnetic dipole conductive part 212.

The electric dipole 210 is adjusted based on the third dielectric layer 130 and the fourth dielectric layer 140. In the present embodiment, the shape of the electric dipole conductive parts 221 and 222 of the electric dipole 220 are a planar structure, and the electric dipole conductive part 221 is disposed on the surface of the third dielectric layer 130 in the thickness direction by the process of wrapping copper. The bottom end of the electric dipole conductive part 221 is connected with the first magnetic dipole conductive part 211. The second electric dipole conductive part 222 is disposed on the fourth dielectric layer 140, correspondingly.

In the present embodiment, the first electric dipole conductive part 221 and the second electric dipole conductive part 222 are both rectangular conductive sheets, and the material is the copper foil, and the length should be smaller than the length of the first metal via array 213. The size of the first electric dipole conductive part 221 or the second electric dipole conductive part 222 along the current direction is equal to the thickness of the third dielectric layer 130 or the fourth dielectric layer 140.

Since the dielectric layer is introduced, there is a certain requirement about the thickness of the third dielectric layer 130 and the fourth dielectric layer 140, that is, the thickness of the third dielectric layer 130 and the fourth dielectric layer 140 is between one-one-eighth wavelength to half-wavelength, preferably, the thickness is quarter wavelength.

In addition, in order to facilitate the drilling and metallization of the first metal via array 213 during the manufacture process, the metal vias can be extended to pass through the first dielectric layer 110 and the fourth dielectric layer 140 simultaneously, and a rectangular copper structure 450 is disposed respectively on the outer surface of the third dielectric layer 130 and the fourth dielectric layer 140 which are connected with the first metal via array 213.

Embodiment 4

Figure 5:
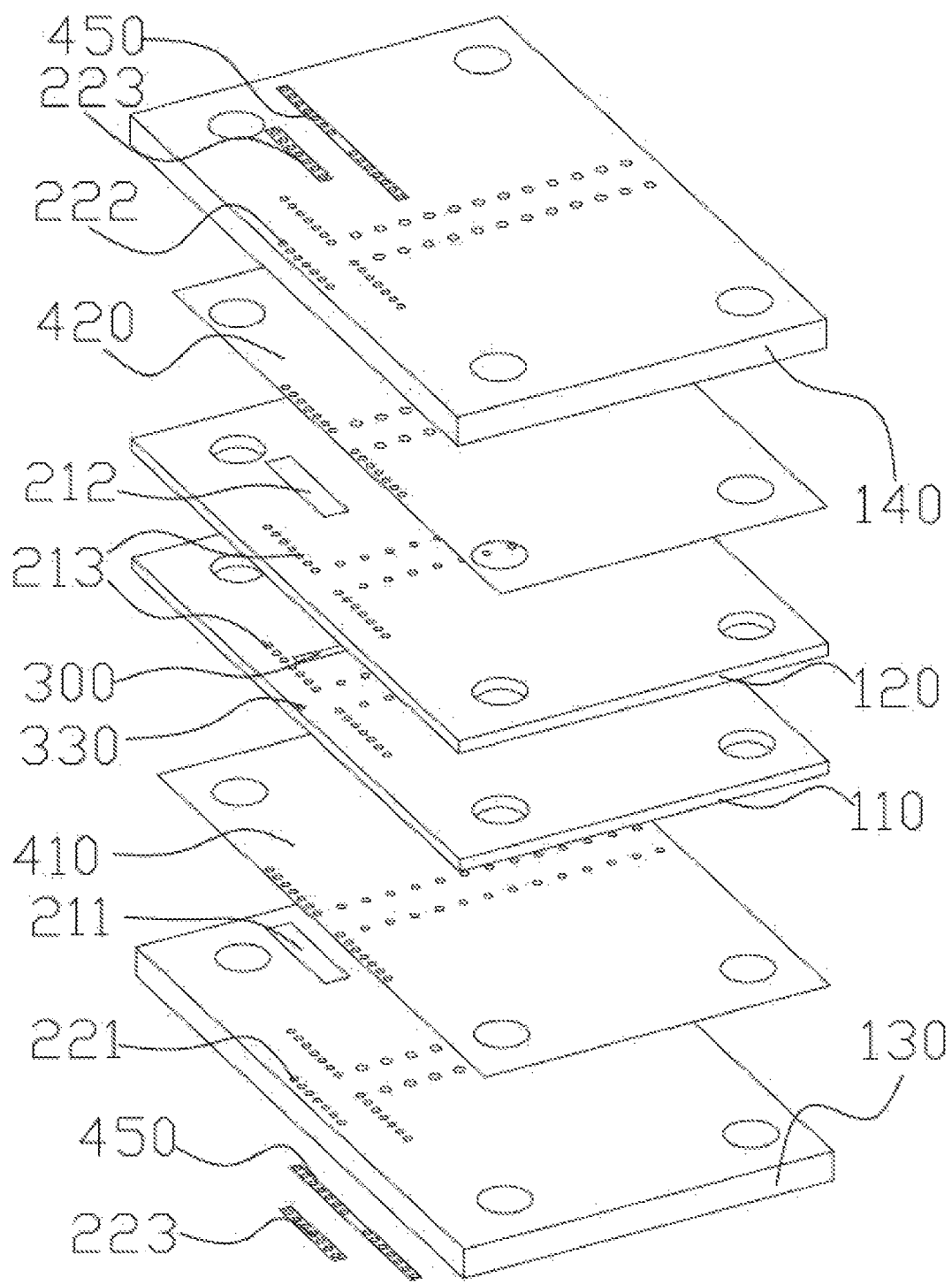
FIG. 5 illustrates an exploded schematic of the antenna element structure according to the embodiment 4 of the present invention.
Figure 6:
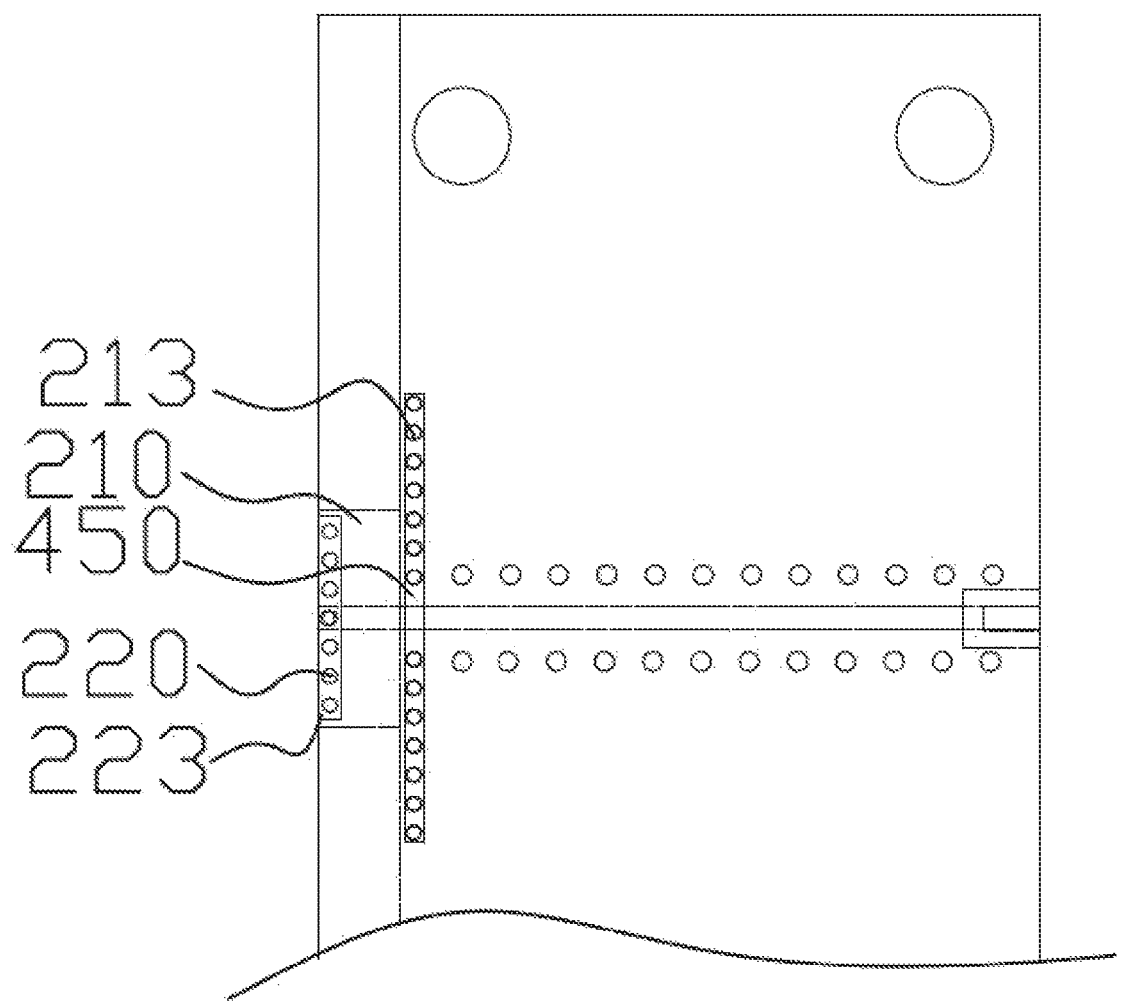
FIG. 6 illustrates a top view schematic of the antenna element structure according to the embodiment 4 of the present invention.

The difference between the present embodiment and the embodiment 2 is that, the PCB board 100 in the present embodiment contains a third dielectric layer 130 laminated on the outer surface of the first dielectric layer 110 and a fourth dielectric layer 140 laminated on the outer surface of the second dielectric layer 120 as shown in FIGS. 5 and 6. The third dielectric layer 130 is disposed on the outer surface of the first magnetic dipole conductive part 211, and the fourth dielectric layer 140 is disposed on the outer surface of the second magnetic dipole conductive part 212.

The electric dipole 220 is adjusted based on the third dielectric layer 130 and the fourth dielectric layer 140. In this embodiment, the electric dipole conductive parts 221 and of the electric dipole 220 are the metal via arrays disposed in the thickness direction of the board 100, and the metal via arrays are disposed in the third dielectric layer 130 and the fourth dielectric layer 140. The first electric dipole conductive part 221 is symmetrically arranged the second electric dipole conductive part 222. For ease of description, the first electric dipole conductive part 221 will be described primarily. The first electric dipole conductive part 221 disposed in a linear arrangement in the third dielectric layer 130, and one end of the first dipole conductive part 221 is connected with the first magnetic dipole conductive part 211, the other end of the first electric dipole conductive part 221 extends to the outer surface of the third dielectric layer 130. A rectangular copper layer 223 is formed on the outer surface of the third dielectric layer 130, and the length of 223 is smaller than the length of the first electric dipole conductive part 221. Similarly, the second electric dipole conductive part 222 is disposed symmetrically with respect to the feed structure 300 in the fourth dielectric layer It is to be noted that the size of metal vias constituting the first electric dipole conductive part 221 and the second electric dipole conductive part 222 and the distance between the adjacent metal vias in this embodiment should meet certain requirements. Specifically, the distance between the adjacent metal vias is less than quarter wavelength, preferably the diameter of a single metal vias is less than one-eighth wavelength, and a group of metal vias forms the effect of a metal wall.

Embodiment 5

Figure 8:
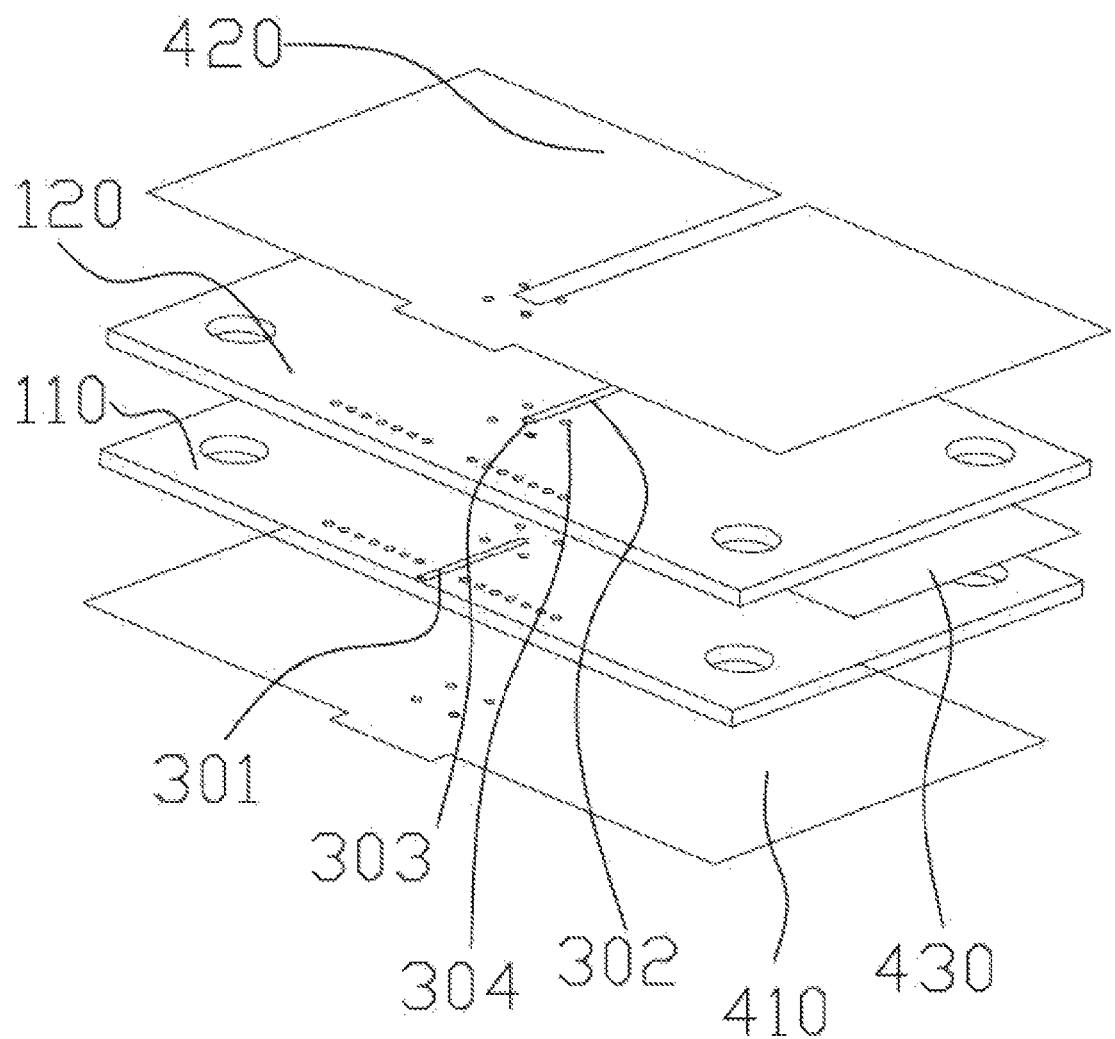
FIG. 8 illustrates an exploded schematic of the structure of the feed structure in the embodiment 5 of the present invention.

The difference between the present embodiment and the above embodiments 1-4 is shown in FIG. 8, which is based on a PCB board with dual layer dielectric substrates. The feed structure 300 of the present embodiment is a transition between coplanar waveguide to strip line. The feed structure 300 contains a first feed metal strip 301 and a second feed metal strip 302. The first metal strip 301 is disposed between the first dielectric layer 110 and the second dielectric layer 120. The first metal strip 301 is connected with the first magnetic dipole conductive part 211 and the second metal strip 302, which is disposed on the outer surface of the first dielectric layer 110 or the second dielectric layer 120 through the first feed metal vias 303. The second metal strip 302 is a signal line with a coplanar waveguide structure, which is connected with the test connector.

In addition, a third copper layer 430 is disposed between the first dielectric layer 110 and the second dielectric layer 120. An even number of the second feed metal vias 304 disposed around the first feed metal vias 303 are connected with the first copper layer 410, the second copper layer 420, and the third copper layer. It can be understood that the second feed metal vias 304 needs to pass through the first dielectric layer 110 and the second dielectric layer 120. Preferably, the second feed metal vias 304 are symmetrically disposed around the first feed metal vias 303 to improve the performance of RF signal transmission.

The embodiments of the present invention have been described in detail along with the accompanying drawings, while it is not limited to the above-described embodiments, it will be understood by those skilled in the art that various modifications may be made without departing from the spirit of the present invention.

What is claimed is:

1. A novel antenna element for a 5G mobile terminal, comprising:
    a printed circuit board (PCB) having a first surface and a second surface;
    a radiating element comprising a magnetic dipole and an electric dipole disposed on at least one of the first surface and second surface of the PCB, wherein the magnetic dipole includes a first magnetic dipole conductive part and a second magnetic dipole conductive part disposed on the first surface and the second surface of the PCB, wherein the electric dipole includes a first electric dipole conductive part connected with the first magnetic dipole conductive part and a second electric dipole conductive part connected with the second magnetic dipole conductive part;
    a feed structure having a magnetic dipole and an electric dipole, wherein the feed structure is disposed between a first dielectric layer and a second dielectric layer included in the PCB, and is connected with the first magnetic dipole conductive part and the magnetic dipole extends a ground terminal; and
    a first metal via array, which penetrates the PCB, connected with edges of the first magnetic dipole conductive part and the second magnetic dipole conductive part.

2. The novel antenna element of claim 1, wherein the first magnetic dipole conductive part and the second magnetic dipole conductive part are copper sheets arranged in parallel to each other.

3. The novel antenna element of claim 1, wherein the first electric dipole conductive part or the second electric dipole conductive part is a metal block.

4. The novel antenna element of claim 3, wherein a shape of the first electric dipole conductive part or the second electric dipole conductive part is a rectangular or a ladder-shape.

5. The novel antenna element of claim 3, wherein a length of the first electric dipole conductive part or the second electric dipole conductive part along a current direction is ranging from one-eighth wavelength ($\lambda/8$) to a half wavelength ($\lambda/2$), preferably, a quarter-wavelength ($\lambda/4$).

6. The novel antenna element of claim 3, wherein the first electric dipole conductive part and the second electric dipole conductive part are connected with the first magnetic dipole conductive part and the second magnetic dipole conductive part by a process of surface mount technology (SMT), respectively.

7. The novel antenna element of claim 1, wherein the PCB further comprises a third dielectric layer and a forth dielectric layer disposed on a surface of the first magnetic dipole conductive part and the second magnetic dipole conductive part, wherein the first electric dipole conductive part and the second electric dipole conductive part are formed by wrapping copper on the third dielectric layer and the fourth dielectric layer along a thickness direction of the PCB, respectively.

8. The novel antenna element of claim 7, wherein a size of the first electric dipole conductive part or the second electric dipole conductive part in a current direction equals to a thickness of the third dielectric layer or the fourth dielectric layer.

9. The novel antenna element of claim 7, wherein a thickness of the PCB is ranging from one-eighth wavelength to a half wavelength in the third dielectric layer or the fourth dielectric layer, preferably, a quarter-wavelength.

10. The novel antenna element of claim 7, wherein a length of the first electric dipole conductive part and the second electric dipole conductive part in a length direction of the PCB is smaller than a length of the first metal via array, or a length of the first and second magnetic dipole conductive parts in a length direction of the PCB is smaller than the length of the first metal via array.

11. The novel antenna element of claim 1, wherein the PCB further comprises a third dielectric layer and a fourth dielectric layer disposed on a surface of the first magnetic conductive part and the second magnetic conductive part, respectively, wherein the first electric dipole conductive part and the second electric dipole conductive part include a second metal via array passing through the third dielectric layer and the fourth dielectric layer in a thickness direction of the PCB, respectively.

12. The novel antenna element of claim 11, wherein a rectangular copper layer, which is connected with the second metal via array, is disposed on an outer surface of the third dielectric layer or the fourth dielectric layer, and a length of the rectangular copper layers is smaller than a length of the first electric dipole conductive part or the second electric dipole conductive part.

13. The novel antenna element of claim 11, wherein the first electric dipole conductive part and the second electric dipole conductive part are symmetrical with respect to the PCB.

14. The novel antenna element of claim 11, wherein a length of the second metal via array is less than a length of the first metal via array.

15. The novel antenna element of claim 11, wherein a distance between two adjacent vias of the second metal via array is less than a quarter-wavelength, wherein a diameter of each metal via of the second metal via array is less than one eighth of the wavelength.

16. The novel antenna element of claim 1, wherein a distance between two adjacent vias of the first metal via array is less than a quarter-wavelength, and wherein a diameter of each metal via of the first metal via array is less than one eighth of the wavelength.

17. The novel antenna element of claim 1, wherein the feed structure comprises a metal strip line having a first feed terminal and a second feed terminal, wherein the first feed terminal is connected with the electric dipole conductive part through the electric dipole feed metal via array disposed in the first dielectric layer, and wherein the second feed terminal is connected with an external RF frontend module.

18. The novel antenna element of claim 1, wherein the feed structure is distributed in the PCB as a multi-layer PCB, wherein each layer is connected by a first feed metal via penetrating at least one dielectric layer, wherein a second feed terminal is disposed on an outer surface of a dielectric layer that is an outermost layer and the second dielectric layer, wherein the first copper layer, the second copper layer, and the third copper layer are connected with the second metal vias with even number disposed symmetrically around the first feed metal via.

19. The novel antenna element of claim 1, further comprising a ground terminal having a first copper layer disposed on a surface of the first dielectric layer and a second copper layer disposed on a surface of the second dielectric layer, and wherein the first copper layer and the second copper layer are connected by a second metal via array which penetrates the first dielectric layer and the second dielectric layer simultaneously.

20. The novel antenna element of claim 19, wherein the second metal via array is distributed on both sides of the feed structure which are symmetrical with respect to the feed structure.

* * * * *